US008105411B2

(12) United States Patent
Gajjar et al.

(10) Patent No.: US 8,105,411 B2
(45) Date of Patent: Jan. 31, 2012

(54) FLUID FILTER SYSTEM AND METHOD

(75) Inventors: Nekheel Gajjar, Chicago, IL (US); Paul R. Micheli, Glen Ellyn, IL (US)

(73) Assignee: Illinois Tool Works Inc., Glenview, IL (US)

( * ) Notice: Subject to any disclaimer, the term of this patent is extended or adjusted under 35 U.S.C. 154(b) by 672 days.

(21) Appl. No.: 12/200,506

(22) Filed: Aug. 28, 2008

(65) Prior Publication Data
US 2010/0050870 A1    Mar. 4, 2010

(51) Int. Cl.
*B01D 50/00* (2006.01)

(52) U.S. Cl. ............. 55/486; 55/487; 55/489; 55/527; 55/528; 55/477; 55/498; 55/529; 55/DIG. 46; 95/273; 95/286; 95/287; 442/35; 442/327; 442/402; 442/408

(58) Field of Classification Search ............ 55/486–489, 55/527–528, 477, 498, 529, DIG. 46; 95/273; 95/286–287; 442/35, 327, 402, 408
See application file for complete search history.

(56) References Cited

U.S. PATENT DOCUMENTS

| | | | |
|---|---|---|---|
| 1,930,357 A * | 10/1933 | Heather | ........................ 96/121 |
| 3,458,977 A | 8/1969 | Young et al. | |
| 3,568,416 A * | 3/1971 | Staunton | ........................ 96/133 |
| 3,599,399 A | 8/1971 | Gallen | |
| 3,744,222 A | 7/1973 | Delao | |
| 3,763,633 A * | 10/1973 | Soltis | ................................ 96/58 |
| 4,126,141 A * | 11/1978 | Grossman | ..................... 131/331 |
| 4,321,064 A | 3/1982 | Vargo | |
| 4,323,374 A | 4/1982 | Shinagawa et al. | |
| 4,366,054 A * | 12/1982 | Kronsbein | ..................... 210/266 |
| 4,536,440 A * | 8/1985 | Berg | ............................. 442/346 |

(Continued)

FOREIGN PATENT DOCUMENTS

JP        2005169167        6/2005
(Continued)

OTHER PUBLICATIONS

Super PaintGuard, Cumulus Fibres, a Division of Leggett & Platt.

*Primary Examiner* — Jason M Greene
*Assistant Examiner* — Dung H Bui
(74) *Attorney, Agent, or Firm* — Fletcher Yoder PC (57) ABSTRACT

A system, in certain embodiments, includes a fluid filter that includes a first set of strips of a first filter material having a first density, and a second set of strips of a second filter material having a second density greater than the first density, wherein the first set and second set of strips are arranged in an alternating pattern to define a first filter layer. The system also includes a second filter layer comprising a third filter material having a third density greater than the second density, wherein the first filter layer is coupled to the second filter layer. In other embodiments, the system includes a fluid filter which includes a first filter material having a first density, a second filter material having a second density greater than the first density, and a third filter material having a third density greater than the second density. The system may also include the first filter material coupled to both the second filter material and the third filter material, as well as the second filter material coupled to both the first filter material and the third filter material.

27 Claims, 7 Drawing Sheets

U.S. PATENT DOCUMENTS

| | | | |
|---|---|---|---|
| 4,787,920 A * | 11/1988 | Richard | 95/214 |
| 4,878,974 A * | 11/1989 | Kagawa | 156/85 |
| 4,917,942 A * | 4/1990 | Winters | 96/99 |
| 4,921,512 A * | 5/1990 | Maryyanek et al. | 55/488 |
| 5,085,766 A * | 2/1992 | Born | 210/150 |
| 5,221,230 A * | 6/1993 | Darvin et al. | 454/53 |
| 5,419,953 A | 5/1995 | Chapman | |
| 5,658,641 A * | 8/1997 | Berrigan et al. | 428/152 |
| 5,814,219 A * | 9/1998 | Friedmann et al. | 210/493.3 |
| 6,017,377 A | 1/2000 | Brown et al. | |
| 6,063,167 A * | 5/2000 | Rutkowski | 96/55 |
| 6,071,419 A | 6/2000 | Beier et al. | |
| 6,156,086 A * | 12/2000 | Zhang | 55/382 |
| 6,156,089 A * | 12/2000 | Stemmer et al. | 55/467 |
| 6,214,093 B1 * | 4/2001 | Nabata et al. | 96/11 |
| 6,231,646 B1 | 5/2001 | Schweizer et al. | |
| 6,409,805 B1 | 6/2002 | Beier et al. | |
| 6,464,761 B1 * | 10/2002 | Bugli | 96/135 |
| 6,579,350 B2 * | 6/2003 | Doherty | 96/67 |
| 6,616,723 B2 * | 9/2003 | Berger | 55/527 |
| 6,682,576 B1 | 1/2004 | Kiyotani et al. | |
| 6,923,911 B1 | 8/2005 | Beier et al. | |
| 7,132,010 B2 * | 11/2006 | Carlsson | 96/55 |
| 7,186,287 B2 | 3/2007 | Beier | |
| 7,326,272 B2 * | 2/2008 | Hornfeck et al. | 55/524 |
| 7,390,351 B2 * | 6/2008 | Leir et al. | 96/15 |
| 7,442,303 B2 * | 10/2008 | Jacobson | 210/510.1 |
| 7,459,013 B2 * | 12/2008 | Holmes et al. | 96/132 |
| 7,771,517 B2 * | 8/2010 | Dralle | 95/273 |
| 7,854,788 B2 * | 12/2010 | Byrd et al. | 95/45 |
| 2004/0035095 A1 * | 2/2004 | Healey | 55/486 |
| 2005/0011173 A1 * | 1/2005 | Hornfeck et al. | 55/486 |
| 2005/0178268 A1 * | 8/2005 | Beier | 95/286 |
| 2006/0000196 A1 | 1/2006 | Beier et al. | |
| 2007/0026754 A1 * | 2/2007 | Martin Rivera et al. | 442/402 |
| 2007/0180997 A1 * | 8/2007 | Leir et al. | 96/69 |
| 2008/0166938 A1 | 7/2008 | Adorno et al. | |
| 2008/0202078 A1 * | 8/2008 | Healey et al. | 55/341.1 |
| 2010/0107881 A1 * | 5/2010 | Healey et al. | 96/11 |

FOREIGN PATENT DOCUMENTS

| | | |
|---|---|---|
| JP | 2006289174 | 10/2006 |
| JP | 2007153967 | 6/2007 |
| WO | WO 86/01430 | 3/1986 |
| WO | WO 8801900 A1 * | 3/1988 |
| WO | WO 94/28997 | 12/1994 |
| WO | WO 02/053263 | 7/2002 |
| WO | WO2007119508 | 10/2007 |

* cited by examiner

FLUID FILTER SYSTEM AND METHOD

BACKGROUND

The present technique relates generally to spray systems and, more particularly, to industrial spray coating systems. The present technique specifically provides a system and method for filtering particles from a fluid in an enclosure for a spray coating device by enabling fluid flow through three materials of varying degrees of density to remove particles.

Spray coating devices are used to apply a coating to a wide variety of product types and materials, such as wood and metal. The spray coating fluids, such as paints or stains, used for each different industrial application may have much different fluid characteristics and desired coating properties. For example, air atomizing spray guns may cause particles of atomized viscous paint to become airborne during the spray process. Some of the particles or droplets viscous of paint do not attach to the target object. The remaining overspray particles in the air make the air unsuitable for the environment outside the booth and undesirable for health and environmental reasons. Further, paint droplets may attach to the booth walls or ceiling. In addition, droplets of the coating fluid may be removed from the air within an enclosure to comply with environmental regulations and to enable a subsequent application of a different coating, such as a different paint color. In order to remove a significant amount of particles from the air being filtered at an acceptable rate, high density material may be used over a large surface area, requiring a significant force, such as a vacuum, to draw the fluid through the material. The fluid forcing device, such as a fan, and the energy required to run such a device can be costly to purchase, operate, and maintain. In addition, blocked filters degrade the air flow across the booth, which in turn deteriorates the transfer efficiency of the coating applicator system. Thus, blocked filters require addition coating material to be applied.

BRIEF DESCRIPTION

A system, in certain embodiments, includes a fluid filter that includes a first set of strips of a first filter material having a first density, and a second set of strips of a second filter material having a second density greater than the first density, wherein the first set and second set of strips are arranged in an alternating pattern to define a first filter layer. The system also includes a second filter layer comprising a third filter material having a third density greater than the second density, wherein the first filter layer is coupled to the second filter layer. In other embodiments, the system includes a fluid filter which includes a first filter material having a first density, a second filter material having a second density greater than the first density, and a third filter material having a third density greater than the second density. The system may also include the first filter material coupled to both the second filter material and the third filter material, as well as the second filter material coupled to both the first filter material and the third filter material.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments provide an improved filter for fluids by providing an arrangement of three or more varying densities of filter material. An embodiment of this arrangement includes an alternating low and medium density material layer coupled to a layer of high density material. The arrangement may cause an improved fluid filtering effect by inducing flow paths that draw out particles as the fluid flows through each of the varying density materials. For example, the disclosed embodiments may flow the fluid through a low density material because it provides the least resistance to fluid flow. Then the fluid may flow through the adjacent medium density filter material, which is of lower resistance than the adjacent high density backing layer. The high density material of the backing layer may remove the smallest particles from the fluid flowing through the filter. In the example, particles are removed by each filter material, including the high density backing layer, which may emit a finely filtered fluid. The thickness of the backing layer may be approximately 25-50% of the thickness of the alternating low and medium density material layer. The disclosed embodiments also may utilize different arrangements of the materials to optimize removal of particles from the fluid. Further, the types and densities of materials used in the filter arrangement may also be varied to optimize and manipulate fluid flow.

Figure 1:
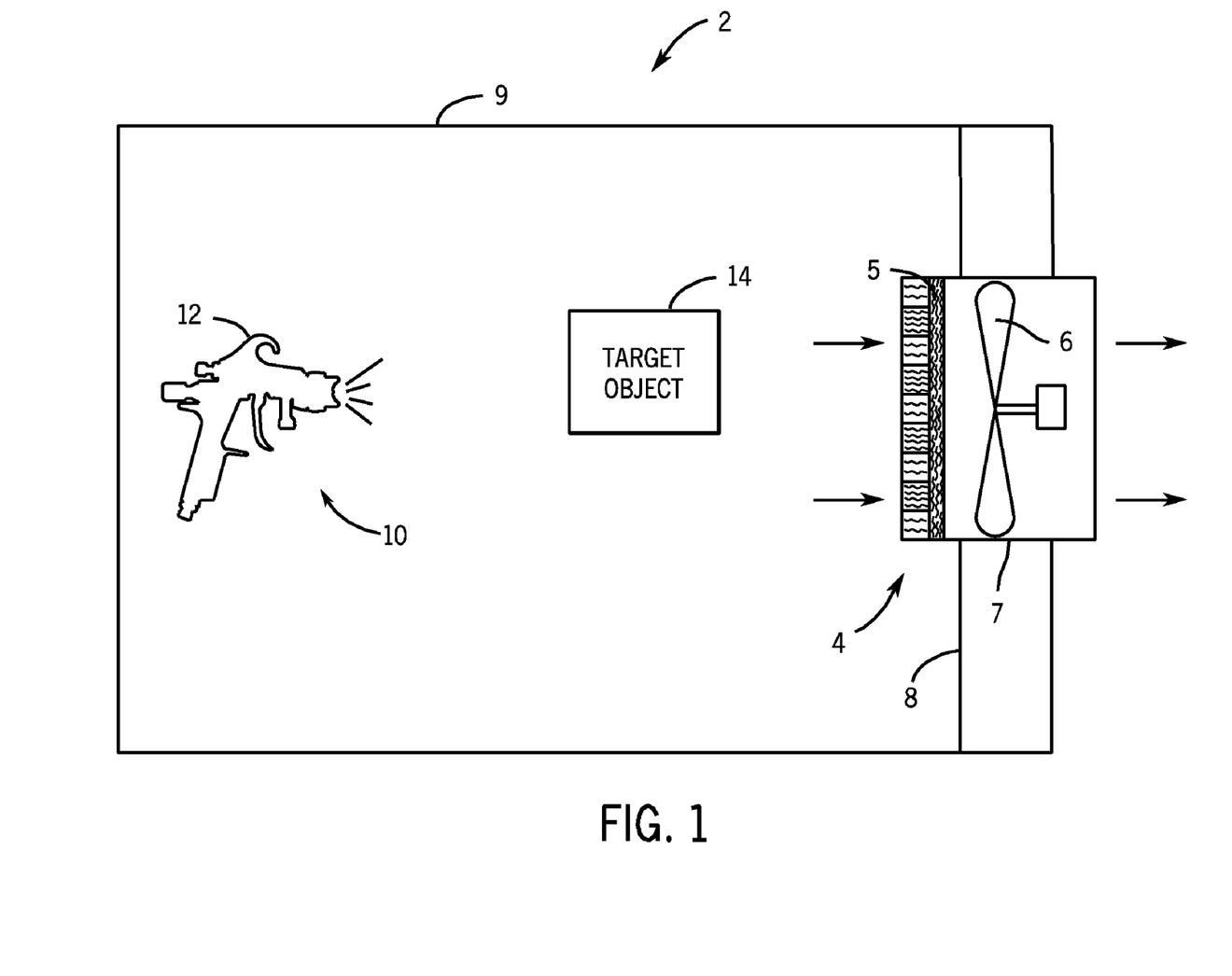
FIG. 1 is a diagram illustrating an exemplary spray coating system, facility, and filter of the disclosed embodiments.

Turning now to the drawings, and specifically FIG. 1, a block diagram of an embodiment of a coating facility 2 is illustrated. The coating facility 2 includes a fluid filter system 4 that also includes a filter 5. As discussed below, filter 5 may be described as a multi-stage, multi-material filter, which includes an arrangement of three or more different density materials to enhance filtration. Fluid filter system 4 also includes fan 6, which may be used to draw a fluid, such as air, through filter 5 via a vacuum or similar technique, thereby exhausting air into the environment. Fluid filter system 4 may be installed within a duct 7 located in wall 8 of coating facility 2. Coating facility 2 may be located in a factory or manufacturing facility and may include an enclosed area, such as booth 9, that keeps foreign particles from contaminating the coating process. Spray coating system 10 may be located within booth 9, and may be used to coat a wood, metal, or similar object with paint, stain, or other coating material. Spray coating device 12 may be used to apply the coating material, via an atomized or other suitable spraying process. Spray coating device 12 may coat a target object 14 with a coating material within booth 9.

As will be discussed in detail below, spray coating device 12 may emit paint particles within booth 9 during the coating process. In particular, particles, such as paint droplets, may remain airborne during application of the coating material to the target object 14. Such airborne particles need to be removed from the air prior to being expelled into facility 2 or the outside environment. In particular, environmental and health regulations may require that a minimum level of air quality is achieved prior to air being expelled into a factory building or to the environment. Moreover, removal of such airborne paint particles is desirable to prevent contamination of booth 9 prior to application of a subsequent coating material to a subsequent target object 14. For example, if a white paint were used to coat a first target object 14 in booth 9, white paint particles are removed from the booth prior to application of a black paint to a second target object 14 in booth 9. Thus, the filter 5 is arranged to enable effective particle removal and minimize the time needed to remove a significant amount of contaminant particles from the fluid.

Figure 2:
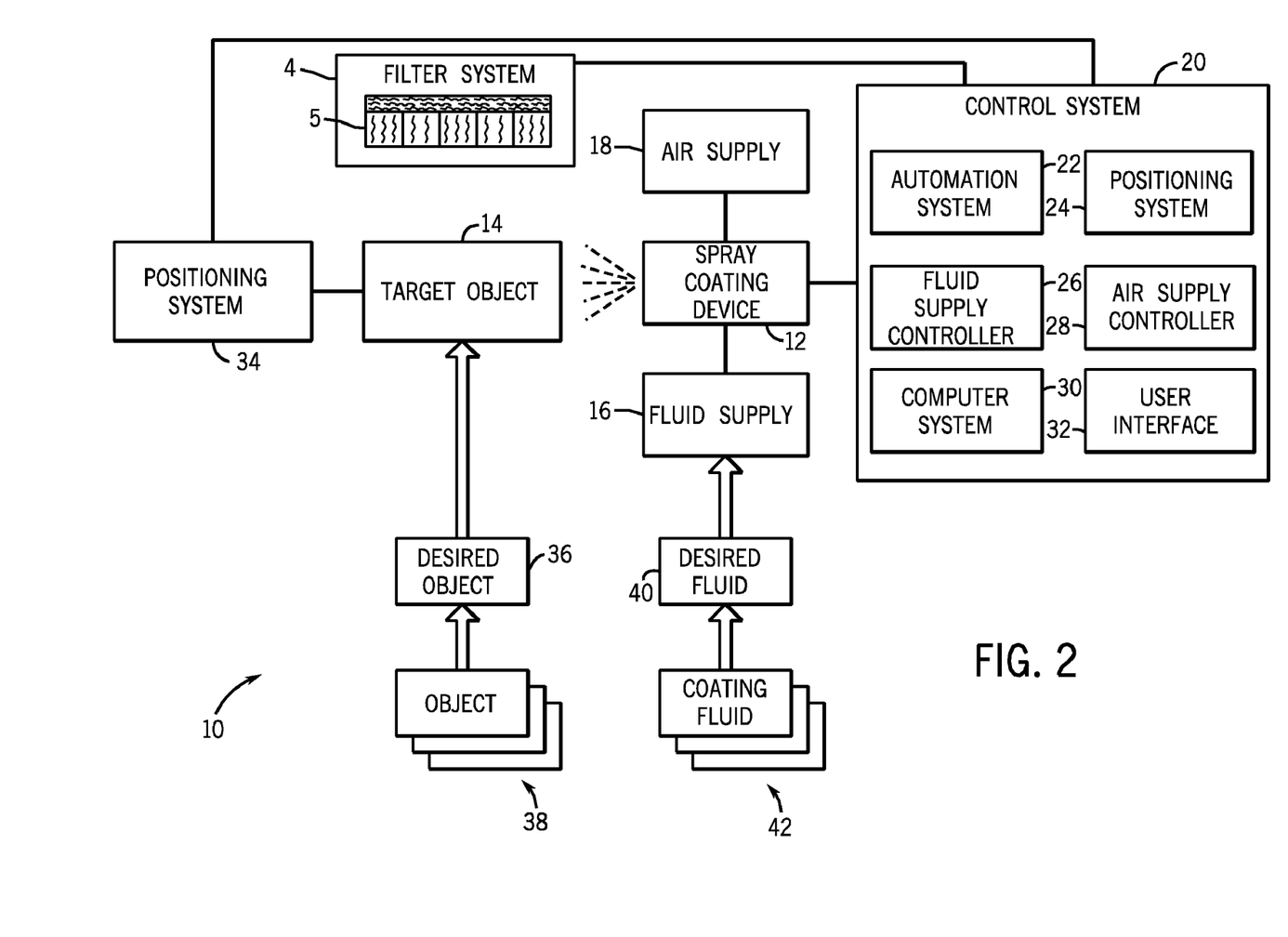
FIG. 2 is a diagram illustrating an exemplary spray coating system with a filter of the disclosed embodiments.

FIG. 2 is a flow chart illustrating an exemplary embodiment of a spray coating system 10 utilizing the unique filter system 4 of FIG. 1. As discussed below, the filter system 4 may include filter 5 with a plurality of different filter materials arranged to provide three or more styles of filtration in multiple directions. The system 10 includes spray coating device 12, which may be used to apply a desired coating to target object 14. The spray coating device 12 may be coupled to a variety of supply and control systems, such as a fluid supply 16, an air supply 18, and a control system 20. The control system 20 facilitates ratio of and control of the fluid 16 and air 18 supplies and further ensures that the spray coating device 12 provides an acceptable quality and finish of spray coating to the target object 14. For example, the control system 20 may include an automation system 22, a positioning system 24, a fluid supply controller 26, an air supply controller 28, a computer system 30, and a user interface 32. The control system 20 is coupled to positioning system 34, which controls the location and movement of target object 14 relative to the spray coating device 12. According, the spray coating system 10 may provide a computer-controlled mixture of coating fluid, fluid and air flow rates, and spray pattern. Moreover, the positioning system 34 may include a robotic arm controlled by the control system 20, such that the spray coating device 12 covers the entire surface of the target object 14 in a uniform and efficient manner.

The spray coating system 10 of FIG. 2 is applicable to a wide variety of applications, fluids, target objects, and types/configurations of the spray coating device 12. For example, a user may select a desired fluid 40 from a plurality of different coating fluids 42, which may include different coating types, colors, textures, and characteristics for a variety of materials such as metal and wood. The user also may select a desired object 36 from a variety of different objects 38, such as different material and product types. As discussed in further detail below, the spray coating device 12 also may comprise a variety of different components and spray formation mechanisms to accommodate the target object 14 and fluid supply 16 selected by the user. For example, the spray coating device 12 may comprise an air atomizer, a rotary atomizer, an electrostatic atomizer, or any other suitable spray formation mechanism.

Figure 3:
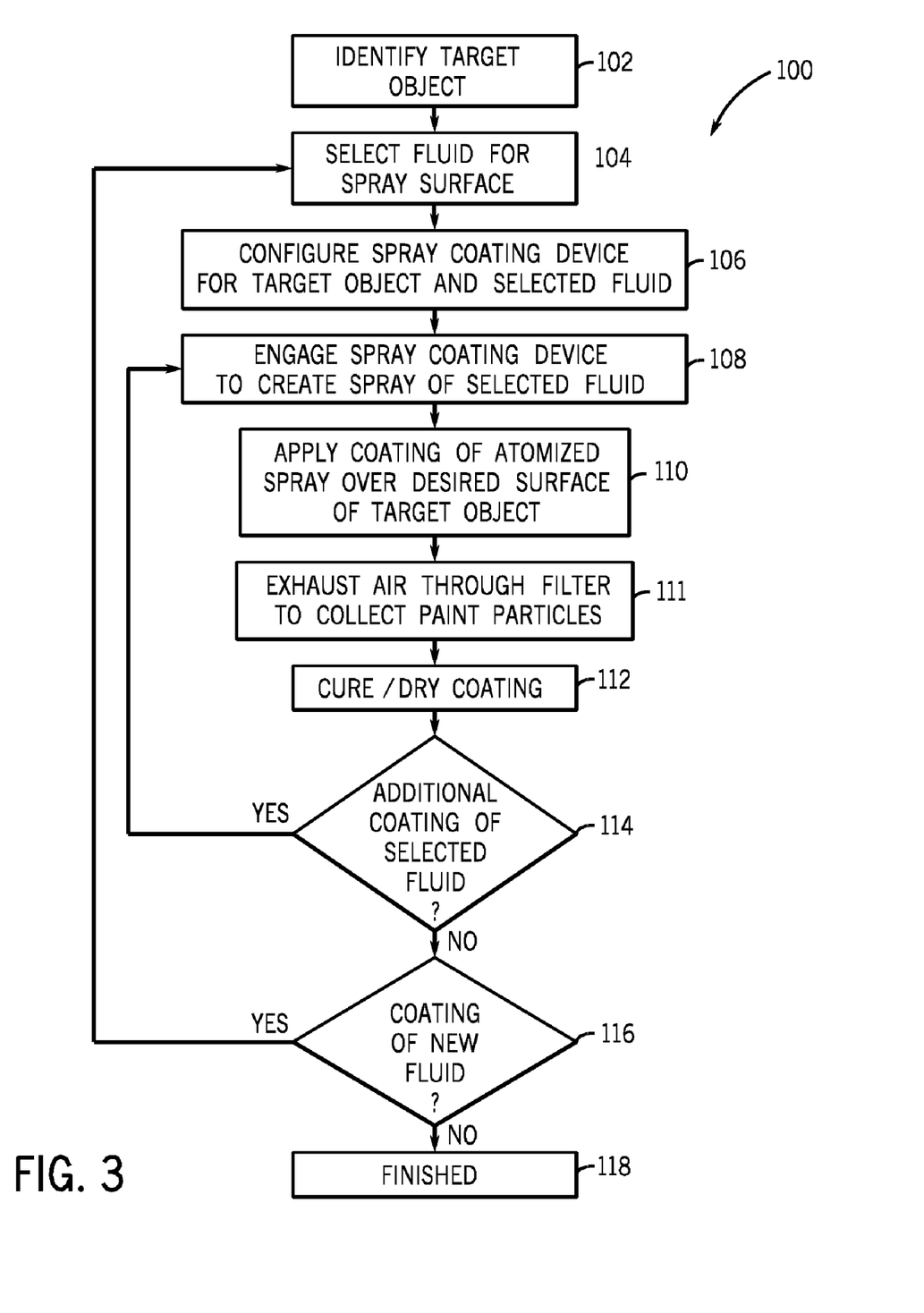
FIG. 3 is a flow chart illustrating an exemplary spray coating process using a filter of the disclosed embodiments.

FIG. 3 is a flow chart of an exemplary embodiment of a spray coating process 100 for applying a desired spray coating to the target object 14. As illustrated, the process 100 proceeds by identifying the target object 14 for application of the desired fluid (block 102). The process 100 then proceeds by selecting the desired fluid 40 for application to a spray surface of the target object 14 (block 104). A user may then proceed to configure the spray coating device 12 for the identified target object 14 and selected fluid 40 (block 106). As the user engages the spray coating device 12, the process 100 then proceeds to create an atomized spray of the selected fluid 40 (block 108). The user may then apply a coating of the atomized spray over the desired surface of the target object 14 (block 110). At block 111, the process 100 exhausts the air with residual airborne particles through a filter (e.g., filter 5) to collect particles before exhausting the air into the environment. The process 100 then proceeds to cure/dry the coating applied over the desired surface (block 112). If an additional coating of the selected fluid 40 is desired by the user at query block 114, then the process 100 proceeds through blocks 108, 110, and 112 to provide another coating of the selected fluid 40. If the user does not desire an additional coating of the selected fluid at query block 114, then the process 100 proceeds to query block 116 to determine whether a coating of a new fluid is desired by the user. If the user desires a coating of a new fluid at query block 116, then the process 100 proceeds through blocks 104-114 using a new selected fluid for the spray coating. If the user does not desire a coating of a new fluid at query block 116, then the process 100 is finished at block 118.

Figure 4:
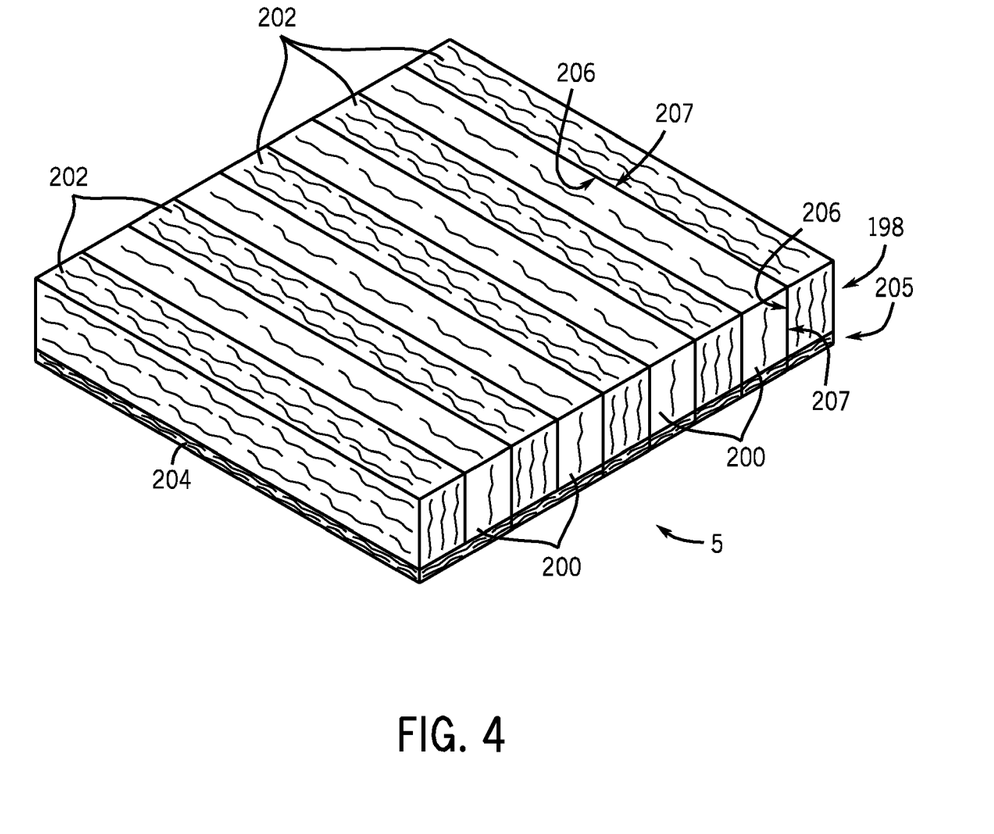
FIG. 4 is a perspective view illustrating an exemplary filter of the disclosed embodiments.

FIG. 4 is a perspective view of an embodiment of fluid filter 5. As depicted, filter 5 includes a first layer 198 (e.g., top or upstream layer) composed of alternating strips of materials that vary in density. In particular, low density filter material 200 alternates with medium density material 202 to compose the first layer 198 of filter 5. For example, low density material 200 may feature relatively larger holes or pores to allow fluid flow through low density material 200 into medium density material 202. Medium density material 202 includes holes or pores that are relatively smaller than those in low density material 200 and are used to retain or catch particles as fluid flows through the alternating material layer. High density material 204 may be used to comprise a second or backing layer 205, which may be attached to the first layer 198 having both low density material 200 strips and medium density material 202 strips in an embodiment. In an embodiment, the thickness of high density material 204 in the backing layer 205 may be approximately 25-50% of the thickness of the first layer 198. High density material 204 may include holes or pores that are relatively smaller than those in medium density material 202 that are designed to prevent the smallest particles from escaping the enclosure as the air or fluid is expelled. Further, low density material 200 may have a density of approximately 40-60% of the high density material 204 and medium density material 202 may have a density of approximately 60-80% of the high density material 204. For example, low density material 200 may be approximately 50% as dense as high density material 204 and medium density material 202 may be approximately 70% as dense as high density material 204. Thus, in sum, the filter 5 includes stages of increasing density, porosity, large scale holes, etc. progressively through materials 200, 202, and 204. In some embodiments, the filter 5 may include 4, 5, 6, 7, 8, 9, 10, or a greater number of progressing greater density or porosity materials to provide staged filtration.

For example, within paint booth enclosure 9, particles of paint may be airborne and drawn into filter 5 via a vacuum effect created by fan 6. As the paint particles are drawn through low density material 200, larger paint particles may be retained by low density material 200 as the air passes on to medium density material 202. Medium density material 202 may then remove smaller particles of paint from the air as it flows to high density material 204, which removes the smallest particles of paint before the air is released outside paint booth 9. Low density material 200, medium density material 202, and high density material 204 each be composed of any suitable filter material, such as a non-woven polyester of varying density and material fiber denier or diameter. Material strips 200 and 202 may be coupled to one another and to high density material 204 by any suitable adhesive, such as a rubber adhesive. For instance, a rubber adhesive may be applied to side surface 206 of medium density material 202 and side surface 207 of low density material 200, thereby forming a continuous layer as the strips are arranged in an alternating fashion to compose the alternating material layer of filter 5. Low density, medium density, and high density materials, 200, 202, and 204, respectively, may be composed of any suitable material of variable porosity, such as a non-woven polyester material, a polyurethane material, a paper based material, or other suitable material. In addition the geometry of cross sections of the strips of material comprising layer 198 may be of a different shape, such as trapezoids or triangles.

Figure 5:
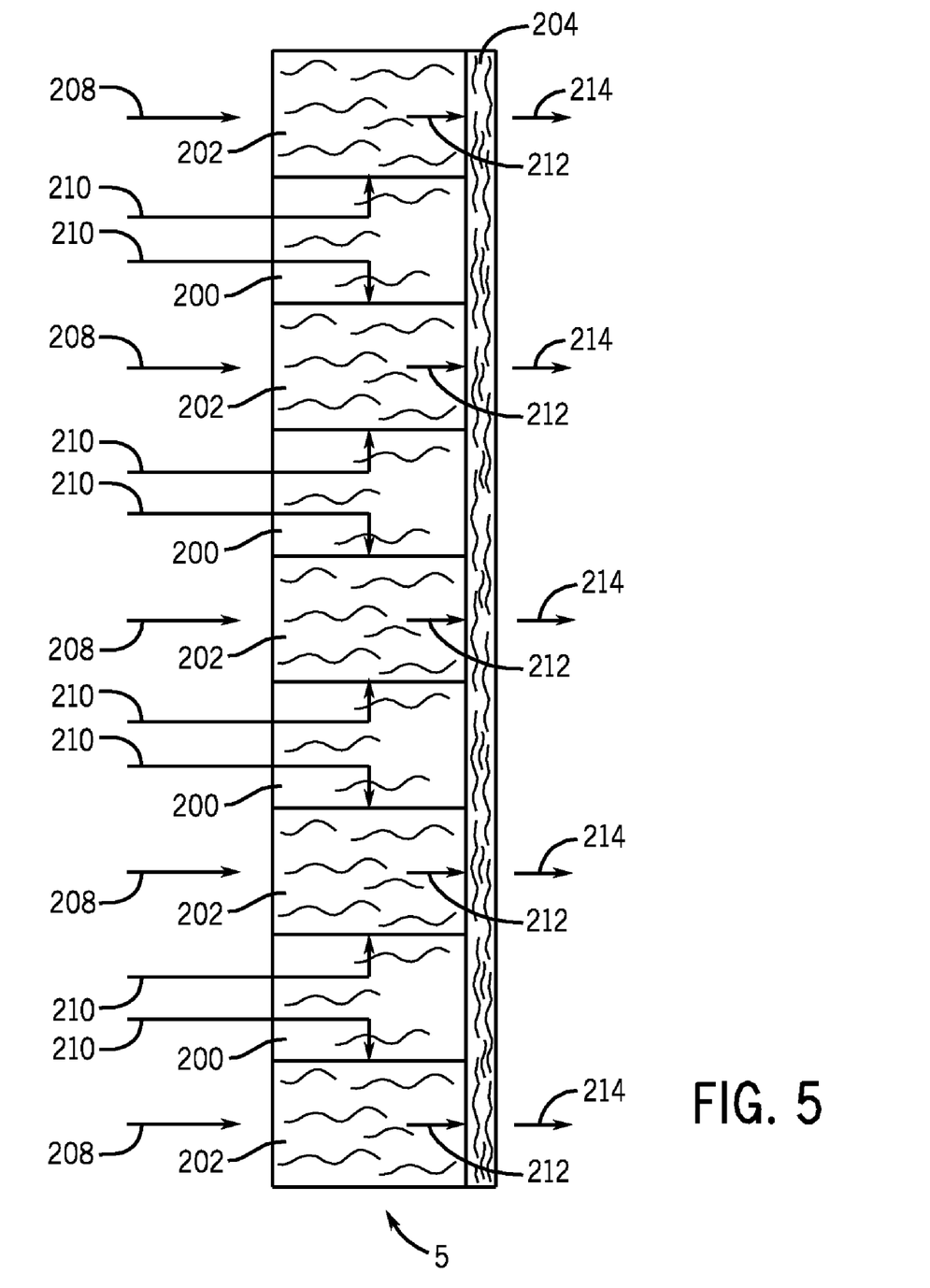
FIG. 5 is a side view illustrating the flow of fluid through an exemplary filter of the disclosed embodiments.

FIG. 5 is a side view illustration of an embodiment of filter 5. As depicted, a fluid, such as air, may flow into filter 5 as shown by arrows 208 and 210. Arrow 208 shows fluid flow toward medium density material 202. Arrow 210 shows fluid flow into low density material 200. As appreciated, fluid flow may be directed around medium density material 202 and into low density material 200, as shown by arrows 210. In particular, the smaller holes or porosity located in medium density material 202 offer greater resistance to flow in direction 208, whereas larger holes or porosity in low density material 200 allow fluid flow in direction 210 to occur through the less resistant and less dense material 200. In other words, the alternating layer arrangement of medium density material 202 and low density material 200 encourages flow into low density material 200 and resists flow into medium density material 202. In other words, the air may generally or substantially flow into low density material 200 prior to (i.e., without first) flowing into medium density material 202. For example, as airborne paint particles flow in direction 210 larger droplets or particles may be captured by low density material 200 as the air flows through filter 5. Air may then pass into medium density material 202, as shown by arrow 210, due to the fact that medium density material 202 offers less resistance than high density material 204. Again, the air may generally or substantially flow from low density material 200 to medium density material 202 prior to (i.e., without first) flowing into high density material 204. In other words, as fan 6 draws fluid from left to right in the diagram, the fluid flows through in the path of least resistance in stages or in series rather than in parallel through the materials 200, 202, and 204. In particular, fluid flows first into low density material 200, then flows through medium density material 202, and then flows into and through high density material 204, as shown by arrow 212. As particles flow through medium density material 202 they are caught by medium sized holes or porosity within the material, then smaller particles may be trapped by high density material 204, which includes smaller holes or porosity, thereby producing a filtered fluid after passing through filter 5, shown by arrow 214. In other embodiments, filter 5 may include 4, 5, 6, 7, 8, 9, 10, or more stages of different materials that force air flow in changing directions. For example, the filter stages may force air flow in alternating crosswise directions.

Figure 6:
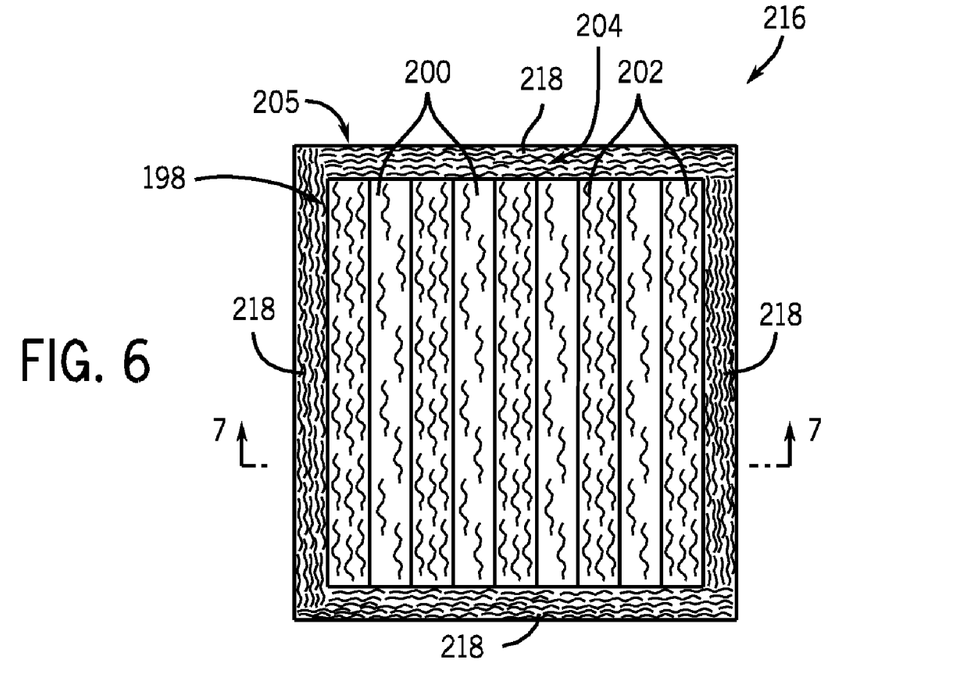
FIG. 6 is a top view illustrating another exemplary filter of the disclosed embodiments.

FIG. 6 is a top view of an embodiment of filter 216. As depicted, filter 216 includes alternating strips of low density material 200 and medium density material 202, which form a layer 198 that is coupled to a backing layer 205 of high density material 204. High density backing layer 205 includes an edge area 218, which protrudes laterally on each side, as well as above and below the edges of the alternating strip first layer 198. In other embodiments, edge area 218 may protrude only from the left and right side or only from the top and bottom side of filter 216. As depicted, edge area 218 of high density material 204 enables filter 216 to be placed firmly inside a duct 7 opening thereby, providing a tight seal between filter 216 and the duct 7 opening. Thus, edge area 218 may be described as a lip, a flange, a stepped perimeter, or a mounting frame or seal. As previously discussed, the alternating arrangement of low density material 200, medium density material 202, and high density backing material 204 enable a fluid flow path that encounters progressively increased resistance as the fluid flows through the filter 216. Moreover, the filter 216 forces air flow in alternating directions, e.g., that are generally crosswise to one another. The illustrated arrangement of filter 216 provides an improved arrangement to remove particles from the fluid as it flows through the filter 216.

Figure 7:
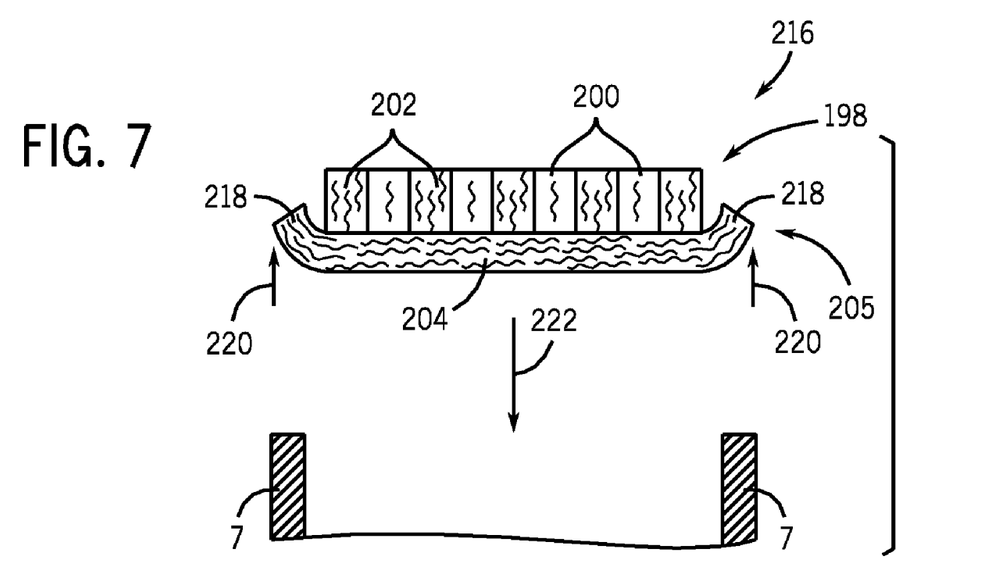
FIG. 7 is a sectional side view illustrating the filter of FIG. 6.

FIG. 7 is an illustration of a sectional side view of the embodiment of filter 216 shown in FIG. 6. Filter 216 includes alternating strips of low density material 200 and medium density material 202, which are coupled to a backing layer 205 composed of high density material 204. As shown, high density material 204 may protrude laterally from the edge surfaces of the first layer composed of alternating medium and low density material, 202 and 200, respectively. Backing layer composed of high density material 204 includes edges 218, which may be pushed up, as shown by arrows 220, when filter 216 is placed in a duct 7 opening. Filter 216 may be placed in a duct opening, shown by arrow 222, to filter particles from a fluid, such as air. The edge areas 218 of high density material 204 may provide an interface or peripheral seal to seal filter 216 within the opening of duct 7, thereby providing a path of high resistance to fluid flow and enabling fluid to flow through low density layer 200 and medium density layer 202 before flowing through high density material 204. Moreover, the backing layer 205 may function as an integral spring-loaded peripheral seal and mount due to resiliency of the high density material 204.

Figure 8:
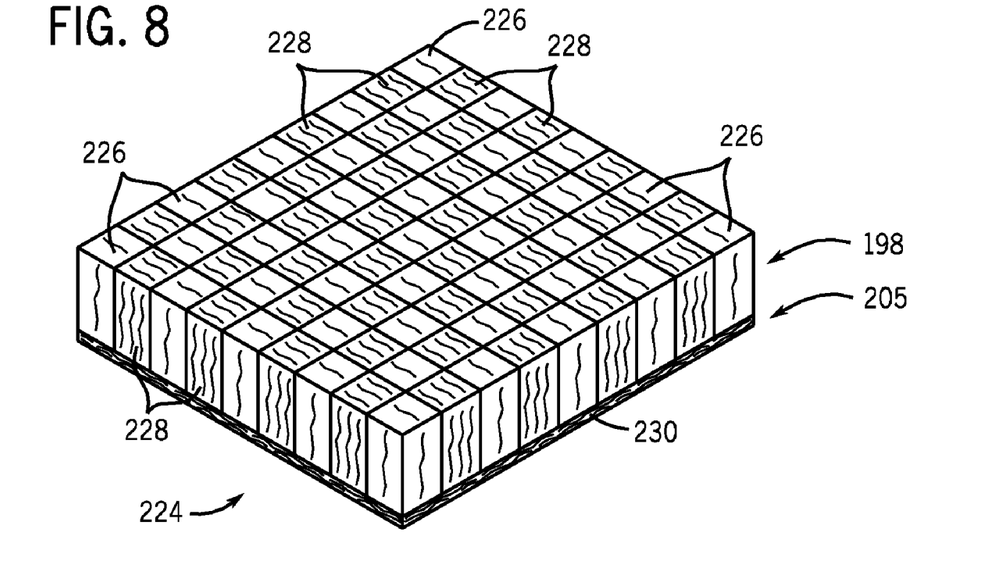
FIG. 8 is a perspective view illustrating another exemplary filter of the disclosed embodiments.

FIG. 8 is a perspective view of another embodiment of filter 224. In an embodiment, low density material 226 may be arranged as blocks in an alternating checker board pattern with blocks of medium density material 228. In other words, blocks of low density material 226 and medium density material 228 may be used to form a checker board pattern that defines a first layer 198 to be adhered to the backing layer 205 composed of high density material 230. As appreciated, the blocks of low density material 226 and medium density material 228 may be coupled to one another by a rubber adhesive or other suitable adhesives. The first layer 198 may be described as an alternating checker board pattern, which may also coupled to a backing layer of high density material 230 by a suitable rubber adhesive. As depicted, the thickness or height of high density material 230 backing layer 205 may be approximately 25-50% or less than the height the alternating checker board layer 198. As previously discussed, fluid flow may occur through filter 224 by first entering low density material 226, through medium density material 228, and finally through high density material 230, thereby producing a filtered fluid. Again, the filter 224 may be described as a multi-stage, multi-directional, alternating pattern filtration system, which may include 3, 4, 5, 6, 7, 9, 9, 10 or more different density or porosity materials.

Figure 9:
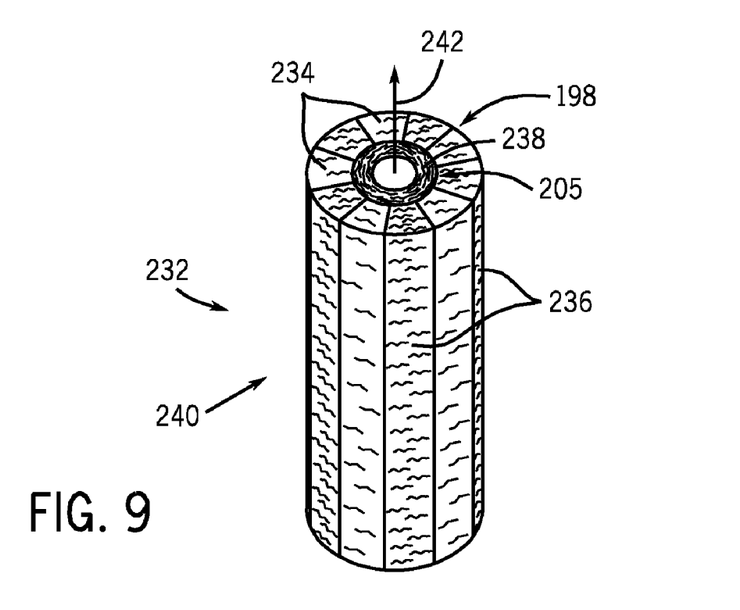
FIG. 9 is a perspective view illustrating another exemplary filter of the disclosed embodiments.

FIG. 9 is a perspective view of an embodiment of fluid filter 232. The embodiment of fluid filter 232 may be described as a cylinder filter. The cylinder filter 232 may include a first or outer filter layer 198 composed of low density material 234 and medium density material 236. Further, the outer layer 198 of alternating low density material 234 and medium density material 236 may be coupled to an inner layer 205 composed of high density material 238. As appreciated, fluid may flow into filter 232 in direction 240 toward the outer layer and through low density material 234 and subsequently through medium density material 236. As the fluid flows through low density material 234 and medium density material 236, gradually smaller and smaller particles may be removed from the fluid. In an example, fluid may then flow through high density material 238 or inner layer 205, to remove the smallest particles from the fluid, thereby enabling fluid to flow out of the filter in axial direction 242. In another embodiment, fluid filter 232 may arrange layer 198 with low and medium density materials 234 and 236 inside (rather than outside) layer 205 of high density material 238. Embodiments of the illustrated filter and filtering technique enable improved particle removal from fluid while providing a simple and effective arrangement for a filter system, thereby providing a simple and low cost production of a filter. Further, embodiments of the filter system may provide an inexpensive disposable filter or, alternatively, a filter that may be removed, cleaned and replaced for repeated use.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
   a fluid filter, comprising:
      a first set of strips of a first filter material having a first density;
      a second set of strips of a second filter material having a second density greater than the first density, wherein the first set and second set of strips are arranged in an alternating pattern to define a first filter layer; and
      a second filter layer comprising a third filter material having a third density greater than the second density, wherein the first filter layer is coupled to the second filter layer.

2. The system of claim 1, wherein the first and second filter layers comprise planar layers.

3. The system of claim 1, wherein the first and second filter layers comprise concentric annular layers.

4. The system of claim 1, wherein the first, second, and third filter materials comprise a non-woven polyester material.

5. The system of claim 1, wherein the first density is approximately 40-60% of the third density and the second density is approximately 60-80% of the third density.

6. The system of claim 1, wherein the first layer has a first thickness greater than a second thickness of the second layer.

7. The system of claim 1, wherein the first and second sets of strips have a uniform thickness that is uniform among the first and second sets of strips.

8. The system of claim 1, wherein the first and second sets of strips have a uniform width.

9. The system of claim 1, wherein the first and second sets of strips have a non-uniform width.

10. The system of claim 1, comprising an exhaust duct having the fluid filter.

11. The system of claim 1, comprising a spray coating system having the fluid filter.

12. A system, comprising:
   a fluid filter, comprising:
      a first filter material having a first density;
      a second filter material having a second density greater than the first density;
      a third filter material having a third density greater than the second density;
      wherein the first filter material is coupled to both the second filter material and the third filter material; and
      wherein the second filter material is coupled to both the first filter material and the third filter material.

13. The system of claim 12, wherein the first filter material comprises a first set of strips and the second filter material comprises a second set of strips, wherein the first set and second set of strips are arranged in an alternating pattern to define a first filter layer.

14. The system of claim 13, wherein the third filter material comprises a second filter layer coupled to the first filter layer.

15. The system of claim 14, wherein the first and second filter layers comprise planar layers.

16. The system of claim 12, wherein the first and second filter materials have a uniform thickness that is uniform among the first and second filter materials.

17. The system of claim 12, wherein the first filter material comprises a first set of blocks and the second filter material comprises a second set of blocks, wherein the first set and second set of blocks are arranged in an alternating checker pattern to define a first filter layer.

18. A method of operation, comprising:
   receiving a fluid through a first filter material having a first density;
   receiving the fluid through a second filter material having a second density greater than the first density; and
   receiving the fluid through a third filter material having a third density greater than the second density, wherein the first and second filter materials are both coupled to one side of the third filter material.

19. The method of claim 18, wherein the first filter material comprises a first set of strips and the second filter material comprises a second set of strips, wherein the first set and second set of strips are arranged in an alternating pattern to define a first filter layer.

20. The method of claim 19, wherein the third filter material defines a second filter layer coupled to the first filter layer.

21. The method of claim 18, wherein the fluid flows generally sequentially through the first, second and third filter materials.

22. The method of claim 21, wherein the fluid flows in alternating crosswise directions sequentially through the first, second and third filter materials.

23. The method of claim 21, wherein the first and second filter materials have a uniform thickness that is uniform among the first and second materials.

24. The system of claim 1, wherein adjacent strips of the first and second sets of strips in the alternating pattern have side walls that are coupled together lengthwise along the adjacent strips.

25. The system of claim 13, wherein adjacent strips of the first and second sets of strips in the alternating pattern have side walls that are coupled together lengthwise along the adjacent strips.

26. The system of claim 17, wherein adjacent blocks of the first and second sets of blocks in the alternating checker pattern have side walls that are coupled together.

27. The method of claim 19, wherein adjacent strips of the first and second sets of strips in the alternating pattern have side walls that are coupled together lengthwise along the adjacent strips.

* * * * *